F. B. COOK.
CLAMP.
APPLICATION FILED SEPT. 21, 1908.
913,699.
Patented Mar. 2, 1909.
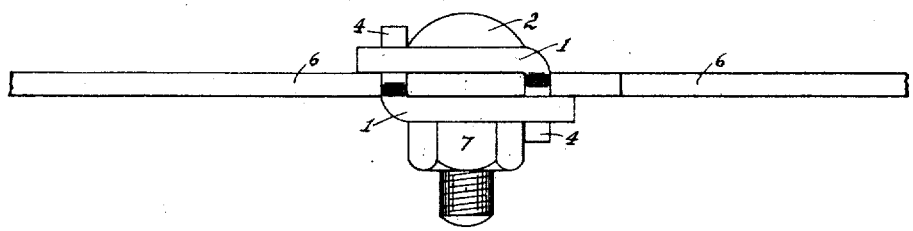
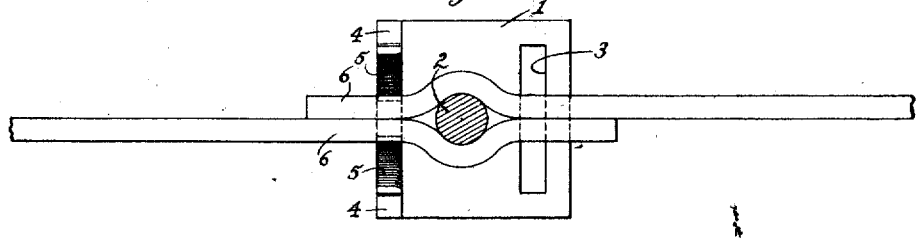
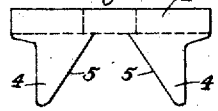
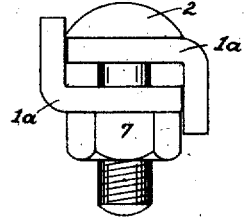
WITNESSES:
Frederick R. Parker.
Clarence E. Cook
INVENTOR:
Frank B. Cook.

UNITED STATES PATENT OFFICE.

FRANK B. COOK, OF CHICAGO, ILLINOIS.

CLAMP.

No. 913,699.  Specification of Letters Patent.  Patented March 2, 1909.

Application filed September 21, 1908. Serial No. 454,101.

*To all whom it may concern:*

Be it known that I, FRANK B. COOK, a citizen of the United States of America, residing at Chicago, in the county of Cook and State of Illinois, have invented a new and useful Clamp, of which the following is a specification, reference being had to the accompanying drawings, illustrating same.

My invention relates to clamps for clamping ropes or strands therein.

The principal objects of my invention are, to provide a clamp which has increased holding power over clamps heretofore used, and to provide simplicity of construction in such a clamp.

In the accompanying drawings, Figure 1 is a side elevation of the clamp of the invention, showing a pair of strands clamped therein; Fig. 2 is a top view of the lower clamping member of Fig. 1, with the upper clamping member and the head of the clamping bolt removed, showing the strands in the position shown in Fig. 1; Fig. 3 is an end elevation of one of the clamping members shown in Fig. 1; and Fig. 4 is a side elevation of a modified form of the clamp of this invention.

Like characters refer to like parts in the several figures.

The clamp comprises two similar angularly-shaped clamping members 1 1 placed together as shown in Fig. 1, and a bolt 2 extending through the members 1 1. Each clamping member 1 has a hole 3 therein forming a yoke to receive the extensions 4 4 of the other clamping member 1, as shown in Fig. 1. The formation of the portions 4 4 is shown in Fig. 3, these portions 4 4 being tapered on their inner faces as at 5 5 so as to draw the strands 6 6 together as shown in Fig. 2, when the clamping members 1 1 are clamped together as shown in Fig. 1.

When the strands 6 6 are first put in place in the clamp they are placed on opposite sides of the bolt 2 in the V-shaped passages 5 5, in a straightened-out position, the portions 4 4 of each clamping member 1 then just starting through the yoke 3 of the opposite portion 1. Now the nut 7 is tightened up on the bolt 2 so as to draw the members 1 1 together as shown in Fig. 1, the tapered faces 5 5 of the portions 4 4 of each clamping member 1 then forcing the strands 6 6 together on each side of the bolt 2 and thereby bending the strands 6 6 around the bolt 2 as shown in Fig. 2. The yokes 3 3 serve to form bearings for the strands outside of the portions 4 4, to hold the strands in alinement as in Fig. 1, and also to support the portions 4 4 and thus keep them from being distorted by excessive stress put upon the bolt 2 in clamping the strands 6 6 in the clamp.

It will readily be seen that bending the strands 6 6 around the bolt 2 and clamping them together on opposite sides of the bolt 2 in the V-shaped portions 5 5, as shown in Figs. 1 and 2, gives a great holding power on the strands to prevent them from being pulled out of the clamp upon excessive stresses therein.

It will be seen that the clamp is very simple in construction and very cheap to manufacture, because the two portions 1 1 are similar and because they can be readily formed out of sheet metal.

The clamp illustrated in Fig. 4 is the same as the clamp illustrated in Figs. 1 and 2, except that in the clamp of Fig. 4 the yokes 3 3 of Figs. 1 and 2 are done away with. This construction permits the clamping members 1ª 1ª of Fig. 4 to be made considerably smaller than the members 1 1 of Figs. 1 and 2, but in the clamp of Fig. 4 the members 1ª 1ª should be made somewhat thicker than the members 1 1 of Figs. 1 and 2 to give the same holding power on the same size strands.

I do not wish to limit this invention to all of the particular details of construction herein shown, as various modifications may be made in same without departing from the scope of the appended claims.

What I claim as my invention is:

1. A clamp of the character described comprising a pair of angularly-formed portions each having a yoke and extensions forming a V-shaped passage, the said extensions on each angularly-formed portion extending through the yoke on the other angularly-formed portion, a bolt extending through the said angularly-formed portions, ropes or strands placed between the said angularly-formed portions on opposite sides of the bolt and in the said V-shaped passages, and a nut on the bolt to be tightened up thereon, whereby the said strands are bent around the bolt and are clamped together in the said V-shaped passages, for purposes substantially as described.

2. A clamp of the character described comprising a pair of clamping members providing a pair of converging passages and means for holding ropes or strands in the passages, and means extending through the clamping members for clamping same to the ropes or strands, whereby ropes or strands placed in the clamp on opposite sides of the latter said means are bent around the latter and are clamped into contact with each other in the said converging passages.

As inventor of the foregoing I hereunto subscribe my name in the presence of two subscribing witnesses, this 18th day of September, 1908.

FRANK B. COOK.

Witnesses:
C. E. COOK,
FREDERICK R. PARKER.